United States Patent
Baniel

(10) Patent No.: US 9,028,906 B2
(45) Date of Patent: May 12, 2015

(54) SWEETENER COMPOSITIONS

(75) Inventor: Avraham Baniel, Jerusalem (IL)

(73) Assignee: Douxmatok Ltd, Tel-Aviv (IL)

( * ) Notice: Subject to any disclaimer, the term of this patent is extended or adjusted under 35 U.S.C. 154(b) by 0 days.

(21) Appl. No.: 13/250,088

(22) Filed: Sep. 30, 2011

(65) Prior Publication Data

US 2012/0088025 A1    Apr. 12, 2012

(30) Foreign Application Priority Data

Oct. 10, 2010    (IL) ........................................ 208594

(51) Int. Cl.
| | |
|---|---|
| A23L 1/09 | (2006.01) |
| A23L 1/0534 | (2006.01) |
| A23L 1/236 | (2006.01) |
| C13K 1/00 | (2006.01) |
| C13K 11/00 | (2006.01) |

(52) U.S. Cl.
CPC ................ A23L 1/09 (2013.01); A23L 1/0534 (2013.01); A23L 1/2363 (2013.01); C13K 1/00 (2013.01); C13K 11/00 (2013.01)

(58) Field of Classification Search
CPC ........ C13K 11/00; C13K 1/00; A23L 1/0534; A23L 1/09; A23L 1/2363
USPC ....................................................... 426/658
See application file for complete search history.

(56) References Cited

U.S. PATENT DOCUMENTS

| | | | | |
|---|---|---|---|---|
| 4,343,820 | A | | 8/1982 | Roseman et al. |
| 4,626,287 | A | * | 12/1986 | Shah et al. ................ 106/162.8 |
| 4,659,388 | A | | 4/1987 | Innami et al. |
| 4,671,823 | A | * | 6/1987 | Shah et al. ................ 106/162.8 |
| 4,774,099 | A | * | 9/1988 | Feeney et al. ................ 426/552 |
| 4,925,693 | A | * | 5/1990 | Lauly ........................... 426/549 |
| 5,252,136 | A | | 10/1993 | Desforges et al. |
| 5,266,335 | A | | 11/1993 | Cherukuri et al. |
| 5,411,730 | A | | 5/1995 | Kirpotin et al. |
| 5,492,814 | A | | 2/1996 | Weissleder |
| 5,709,896 | A | | 1/1998 | Hartigan et al. |
| 6,248,378 | B1 | | 6/2001 | Ganan-Calvo |
| 6,548,264 | B1 | | 4/2003 | Tan et al. |
| 6,703,057 | B2 | * | 3/2004 | Duffett ......................... 426/103 |
| 6,777,397 | B2 | * | 8/2004 | Zehner et al. .................. 514/53 |
| 7,544,379 | B2 | * | 6/2009 | Kawamura et al. ........... 426/573 |
| 2001/0004869 | A1 | | 6/2001 | Cantiani et al. |
| 2003/0014014 | A1 | | 1/2003 | Nitzan |
| 2004/0068224 | A1 | | 4/2004 | Couvillon, Jr. et al. |
| 2004/0161498 | A1 | | 8/2004 | Ripoll et al. |
| 2005/0130240 | A1 | | 6/2005 | Lin et al. |
| 2005/0244568 | A1 | * | 11/2005 | Gokhan ........................ 426/658 |
| 2006/0102455 | A1 | | 5/2006 | Chiang et al. |
| 2009/0297670 | A1 | | 12/2009 | Baniel |
| 2010/0129516 | A1 | * | 5/2010 | Siegel ........................... 426/536 |
| 2011/0059218 | A1 | | 3/2011 | Corliss et al. |

FOREIGN PATENT DOCUMENTS

| | | | |
|---|---|---|---|
| EP | 1447074 | A2 | 8/2004 |
| GB | 2025227 | A | 1/1980 |
| IL | 180687 | A | 4/2011 |
| JP | 04364122 | A | 12/1992 |
| WO | WO9920127 | A1 | 4/1999 |
| WO | WO0113740 | A1 | 3/2001 |
| WO | WO 2004098555 | | 11/2004 |
| WO | WO 2005/084457 | A1 | 9/2005 |
| WO | WO 2006/015880 | A1 | 2/2006 |
| WO | WO 2006062089 | A1 * | 6/2006 |
| WO | WO 2007/007310 | A1 | 1/2007 |
| WO | WO 2007/061810 | A2 | 5/2007 |
| WO | WO2009006208 | A2 | 1/2009 |
| WO | WO2009087215 | A2 | 7/2009 |
| WO | WO2010025158 | A1 | 3/2010 |

OTHER PUBLICATIONS

"Handbuch Subungsmittel: Eigenschaften and Anwendung," pp. 162-165. G.W. von Rymon Lipinski and H. Schiweck; Hamburg, Germany (1990). ISBN: 3-925673-77-6.
Al-Ghouti, et al. New adsorbents based on microemulsion modified diatomite and activated carbon for removing organic and inorganic pollutants from waste lubricants. Chemical Engineering Journal vol. 173, Issue 1 Sep. 2011, 115-128.
Graneinetti Laboratory (undated) http://www.grandinetti.org/Teaching/Chem121/Lectures/VSEPR.
International search report and written opinion dated Apr. 4, 2014 for PCT Application No. IL2013/050851.
International search report and written opinion dated Jul. 20, 2006 for PCT Application No. IL2006/00573.
Kelly, et al. Phase Equilibria in the System Sucrose-Glucose-Fructose. J. appl. Chem. May 4, 1967. 17.5: 125-126.
Middle School Chemistry (undated) http://www.middleschoolchemistry.com/multimedia/chapter4/lesson6.
Office action dated Jan. 10, 2013 for U.S. Appl. No. 11/995,464.
Office action dated Jan. 10, 2014 for U.S. Appl. No. 11/995,464.
Office action dated Apr. 18, 2012 for U.S. Appl. No. 11/995,464.
Office action dated Aug. 15, 2011 for U.S. Appl. No. 11/995,464.
Smith, Jim; Hong-Shum, Lily (2003). Food Additives Data Book. (pp. 704-707). Blackwell Publishing. Online version available at: http://www.knovel.com/web/portal/browse/display? EXT KNOVEL DISPLAY bookid=1381&VerticalID=0.
The surface chemistry of amorphous silica. Zhuravlev model L.T. Zhuravlev Institute of Physical Chemistry, Russian Academy of Sciences, Leninsky Prospect 31, Moscow 117915, Russia Feb. 2000 Elsevier, 38 pages.
U.S. Appl. No. 14/511,046, filed Oct. 9, 2014, Baniel.
Notice of allowance dated Oct. 6, 2014 for U.S. Appl. No. 11/995,464.

* cited by examiner

*Primary Examiner* — Nikki H Dees

(74) *Attorney, Agent, or Firm* — Wilson Sonsini Goodrich & Rosati

(57) ABSTRACT

The invention provides a sweetener composition comprising a combination of cellulose and a sweetener carbohydrate formed from a combination of at least two carbohydrates selected from the group consisting of sucrose, glucose and fructose, and a method for the preparation thereof.

3 Claims, No Drawings

SWEETENER COMPOSITIONS

CROSS-REFERENCE TO RELATED APPLICATION

This application claims the benefit of priority from Israeli Patent Application Ser. No. 208594, filed on Oct. 10, 2010, the contents of which are incorporated herein by reference.

FIELD OF THE INVENTION

The present invention relates to sweetener compositions. More particularly, the present invention relates to carbohydrate sweetener compositions incorporating cellulose therein, and to methods for the preparation thereof.

More particularly, according to the present invention, there is now provided a sweetener composition comprising a combination of cellulose and a sweetener carbohydrate formed from a combination of at least two carbohydrates selected from the group consisting of sucrose, glucose and fructose.

SUMMARY OF THE INVENTION

According to the present invention, it has now been surprisingly discovered that cellulose as such, available abundantly as cotton linters, is molecularly dispersible in molten carbohydrates. Using glucose, fructose and sucrose, it is possible to form melts that can be used as cellulose dispersants and thereby to form novel solid compositions that are obtained on cooling and which are sweeter than the same sweeteners with no cellulose dispersed therein.

In preferred embodiments of the present invention, said compositions are formed from a combination of glucose, fructose and cellulose.

In especially preferred embodiment of the present invention, said compositions are dispersible in water and preferably, are substantially water-insoluble.

Since it is intended that the sweetener compositions be incorporated in food products, preferably said compositions are food compatible: carbohydrates and cellulose used in their manufacture are of food grade quality.

In another aspect of the present invention, there is provided a method for producing a sweetener composition comprising a combination of cellulose and a sweetener carbohydrate formed from a combination of at least two carbohydrates selected from the group consisting of sucrose, glucose and fructose, comprising forming a eutectic melt mixture of a combination of at least two carbohydrates selected from the group consisting of sucrose, glucose and fructose, introducing cellulose into said carbohydrate melt mixture, and cooling the same.

As is known, cellulose consists of linear poly-glucose molecules that assemble linearly to form the fibers that characterize it. Hydrogen bonds, in which the hydrogen of a hydroxyl group interacts weakly with the oxygen of another hydroxyl group assures the plurality of attachments that regulate the overall strength of cellulosic fibers. It is hypothesized that glucose, as well as sucrose and fructose, if one had them in a liquid state allowing for intimate contact with cellulose fibers, provide for a large volume for hydrogen bonds and thereby for separation of cellulosic fibers into slimmer fibrils and down to the poly-glucose molecules; a process of dispersion will take place resulting effectively in dissolution of the cellulose in the liquid carbohydrates.

Thus, liquid carbohydrates are obtained by melting, e.g., sucrose has a melting point of 185° C., however, the melting is accompanied with decomposition, usually referred to as caramelization. Glucose has a melting point of 146° C., and fructose has a melting point of 104° C., and therefore these provide for better relative stability.

In 1967, F. H. C. Kelly and D. W. Brown published an article entitled "PHASE EQUILIBRIA IN THE SYSTEM SUCROSE-GLUCOSE-FRUCTOSE" (J. appl. Chem., 1967, Vol. 17, May) in which the melting points of mixtures of sucrose, glucose and fructose were determined to cover the full range of concentrations in the two and three component systems.

In said article, the relevant teachings of which are incorporated herein by reference, the following eutectics were identified:

(1) Sucrose-glucose at 0.3 mass fraction sucrose and 137° C.;
(2) Sucrose-fructose at 0.3 mass fraction sucrose and 97° C.;
(3) Glucose-fructose at 0.27 mass fraction glucose and 93.2° C.; and
(4) Sucrose (0.175±0.02) m.f., glucose (0225±0.025) m.f. and fructose (0.600±0.005) f.f., with a temperature of 93° C.

DETAILED DESCRIPTION OF THE INVENTION

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include effective embodiments will serve to illustrate the practice of this invention, it being understood that the particulars shown are by way of example and for purposes of instructive discussion of effective embodiments of the present invention only and are presented in the cause of providing what is believed to be the most useful and readily understood description of formulation procedures as well as of the principles and conceptual aspects of the invention.

Example 1

27 grs of glucose powder and 73 grs of fructose powder were intimately mixed in a stainless cylindrical cup of 300 ml volumetric capacity provided with a brush-like agitator sweeping the cylinder walls. The cup was placed in a thermostatically regulated oil bath set to 94° C. Liquid melt droplets formed on the inner wall of the cylinder slowly but at an increasing rate, the whole of the glucose/fructose mixture collecting as moderately viscous melt in the bottom part of the cylinder in 35 minutes.

While continuing the agitation 5 grs of cellulose in the form of finely cut cotton linters were added in small portions over 12 minutes and the agitation continued for 10 minutes more. The cellulose dissolved completely as evidenced by complete clarity of the melt.

The melt solidified and was ground to form sweeteners particles.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A liquid sweetener composition consisting of: a eutectic melt mixture of a combination of at least two sweetener carbohydrates selected from the group consisting of sucrose, glucose and fructose, and a sweetness increasing amount of cellulose dispersed within said eutectic melt mixture, wherein said amount of cellulose is effective to render the sweetener composition sweeter than a mixture of the same sweetener carbohydrates with no cellulose dispersed therein.

2. The sweetener composition according to claim 1, wherein said at least two sweetener carbohydrates are glucose and fructose.

3. The sweetener composition according to claim 1, wherein said composition is food compatible.

* * * * *